Figure 1:
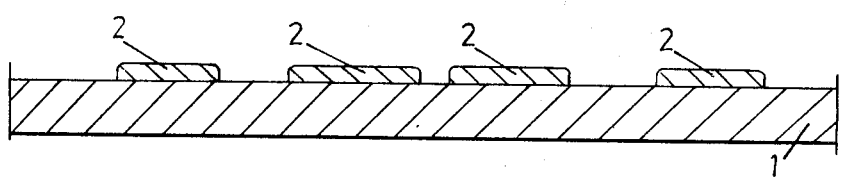

United States Patent [19]
Curtis

[11] 3,914,485
[45] Oct. 21, 1975

[54] SURFACE COVERING MATERIALS

[75] Inventor: Ivan Curtis, Maidstone, England

[73] Assignee: Marley Tile A.G., Zug, Switzerland

[22] Filed: Feb. 20, 1974

[21] Appl. No.: 444,000

[52] U.S. Cl. .................... 428/71; 156/79; 156/246; 156/277; 156/290; 264/45.1; 264/54; 428/159; 428/160; 428/213; 428/425

[51] Int. Cl.² .................... B32B 5/18; B32B 31/14

[58] Field of Search ...... 161/116, 119, 160; 264/45; 156/78, 79; 117/37 R

[56] References Cited
UNITED STATES PATENTS

| | | | |
|---|---|---|---|
| 3,787,259 | 1/1974 | Kleinfeld et al. | 156/78 |
| 3,808,024 | 4/1974 | Witman | 161/160 |
| 3,819,438 | 6/1974 | Witman | 156/79 |

*Primary Examiner*—Edward G. Whitby
*Attorney, Agent, or Firm*—Bacon & Thomas

[57] ABSTRACT

The invention provides a process for the production of surface covering materials having a textured effect which comprises the steps of (a) applying at least one resinous composition to selected areas of a substrate; (b) applying one or more overall layers of at least one foamable resinous composition over the substrate and resinous composition(s) thereon; and (c) heating to effect foaming of the foamable resinous composition(s) whereby a surface covering material having a textured effect is produced. The invention also provides a surface covering material having a textured effect which comprises a substrate or backing layer, resinous composition(s) on selected areas of the substrate or backing layer and at least one layer of a foamed resinous composition over the substrate and the resinous composition(s) thereon, the surface of the foamed resinous composition being at a lower level in areas with the said resinous composition(s) thereunder than in other areas of the surface covering material. The resinous compositions are conveniently polyvinyl chloride plastisols and the substrate may conveniently be a woven or non-woven fabric, a preformed film or a film casting support.

18 Claims, 5 Drawing Figures

SURFACE COVERING MATERIALS

This invention relates to the production of surface covering materials including for example floor covering materials, wall covering materials and covering materials for shelves, working tops and the like.

Polyvinyl chloride surface covering materials are well-know, the term "polyvinyl chloride" being used herein to include both vinyl chloride homopolymers and copolymers. Such surface covering materials can be produced in a variety of ways. For example, sheets of polyvinyl chloride material can be formed using calendering equipment and then laminated together to provide surface covering materials of a desired thickness. In another method, polyvinyl chloride plastisols are applied to a substrate such as asbestos paper or woven hessian fabric followed by gelation of the plastisol and if desired subsequent application of further polyvinyl chloride layers as necessary to provide surface covering materials of adequate thickness. If a film casting substrate is used as substrate as described in British Pat. No. 1,049,651, the substrate can be removed after gelation of the plastisol to provide a flooring material which does not incorporate a substrate. Alternatively layers of polyvinyl chloride material can be applied either side of the substrante, for example as described in British Pat. No. 1,029,085. Also it is possible to manufacture a multilayer polyvinyl chloride flooring material with one or more layers produced by calendering and another layer or other layers produced from polyvinyl chloride plastisol for example as described in British Pat. No. 1,206,584.

It is frequently desirable to provide polyvinyl chloride surface covering materials with a printed pattern for decorative purposes. The usual method of doing this involves printing the pattern on to the surface of the material using appropriate printing inks, e.g. by gravure printing. Having applied a printed pattern, it is usual to cover this with a transparent polyvinyl chloride wear layer; otherwise in use the pattern may quickly be removed by wear. Polyvinyl chloride wear layers can be applied for example either as pre-formed calendered sheets or using polyvinyl chloride plastisols.

For some purposes particularly in the case of floor covering materials, it is desirable to incorporate foamed polyvinyl chloride material into the surface covering in order to provide a product with increased thickness which has resilience and good tread characteristics. It is thus known to produce floor covering materials including a foamed layer by incorporating heat-activatable blowing agents in layers of polyvinyl chloride material produced by calendering or by gelation of polyvinyl chloride plastisols and then to effect decomposition of the blowing agent and consequent foaming.

Where a foamed layer is included in surface covering materials, it has been found that materials of attractive appearance can be obtained by producing textured effects in the foam. The foamed layers are formed by applying a layer of a polyvinyl chloride composition containing a blowing agent on to a support and heating the composition to a temperature sufficient to decompose the blowing agent and thereby to effect foaming. One known method of producing a textured effect is to print a composition containing a foam inhibitor on to selected areas of the surface of the foamable polyvinyl chloride composition prior to heating to effect foaming. Then upon subsequent heating foaming is inhibited in those areas where the foam inhibitor has been applied whilst foaming takes place in the usual way elsewhere. The composition containing the foam inhibitor can for example conveniently by applied by gravure printing, and where the composition used is a printing ink it is possible to obtain textured effects in register with decorative printed patterns on the surface of the foamed layer. There has been a number of alternative proposals for the production of textured effects in surface covering materials including foamed layers, one such proposal being the method of British Pat. No. 1,174,582. It is usual to protect the foamed layer with a transparent wear layer which can for example be applied on to the foamable polyvinyl chloride composition after application of foam inhibitor and printed decorative pattern but before heating to effect foaming.

A further known method of producing a surface covering material having a textured effect involves coating one surface of a flexible sheet which contains depressed areas in its surface with a thermoplastic resinous composition containing an effective amount of foaming agent, and heating the coating to decompose the foaming agent thereby creating a textured decorative surface bearing a plurality of raised areas which conform in shape and position to the depressed areas in the surface of the flexible sheet. A disadvantage of this known method is that the flexible sheet must first be mechanically embossed, the pattern of embossing corresponding to the textured effect desired in the final product. If it is desired to produce surface coverings possessing a different textured effect it is necessary to produce a new embossing roll and this can be a relatively costly operation. Also if the depressed areas in the surface of the flexible sheet are obtained by embossing then it is not easy subsequently to apply decorative prints in register.

It is an object of the present invention to provide a new process for the production of surface covering materials including resinous foam and having a textured effect.

According to one feature of the present invention there is provided a process for the production of surface covering materials having a textured effect which comprises the steps of (a) applying at least one resinous composition to selected areas of a substrate; (b) applying one or more overall layers of at least one foamable resinous composition over the substrate and resinous composition(s) thereon; if desired, printing a decorative pattern on to the surface of the overall layer(s); and (c) heating to effect foaming of the foamable resinous composition(s) whereby a surface covering material having a textured effect is produced. It is in general preferred to protect any decorative pattern printed on to the surface of the overall layer(s) by application of a transparent wear layer which is conveniently applied prior to the heating step to effect foaming.

According to a further feature of the present invention, there is provided a surface covering material having a textured effect which comprises a substrate or backing layer, resinous composition(s) on selected areas of the substrate or backing layer and at least one layer of a foamed resinous composition over the substrate and the resinous composition(s) thereon, the surface of the foamed resinous composition being at a lower level in areas with the said resinous composition(s) thereunder than in other areas of the surface covering material.

The first step in the above process comprises applying resinous composition(s) on to selected areas of a substrate, the application conveniently being effected by rotary screen printing. The resinous compositions so applied are preferably essentially non-foamable, since although foamable compositions which are blown before application of the overall foaming layer(s) can if desired be used this may result in imperfections such as bubbles in the final product.

The product of the process of the present invention will possess a textured effect, the pattern of texturing being such that valleys in the surface of the product correspond to areas where the first resinous composition is applied. Different textured effects can be achieved by altering the pattern in which the first composition is applied and such alteration can be effected relatively easily where rotary screen printing is used to apply the first composition simply by producing a new printing screen.

Suitable substrates for use in the process according to the invention include non-woven and woven fabrics and preformed films. In carrying out the process according to the invention, it is advantageous to select a substrate having good dimensional stability at the elevated temperatures encountered in subsequent steps of the process. Asbestos paper, a material in which asbestos fibres are bonded with synthetic rubber, is one substrate which can conveniently be used; others include woven glass fibre fabrics and glass fibres bonded for example with synthetic resins. If desired, the substrate used may be impregnated with a resinous composition and/or may have one or more layers of resinous composition bonded either to the side on to which the foamable resinous composition is applied or on to the reverse side thereof. Thus for example it may be convenient to apply a levelling coat of a resinous composition (which can be foamable or non-foamable) prior to application of the first resinous composition and/or to apply a further layer or layers of resinous composition (foamable or non-foamable) on to either side of the substrate to increase the thickness of the final product to be obtained. It will be appreciated that any such layer applied form part of the substrate in the sense that the term is used herein.

If desired, a film casting support (i.e. a support which is capable of supporting the foamable resinous composition in contact therewith and adhering thereto to enable the coating and subsequent heating operations to take place, the adhesion being such that the support can be readily removed from the product obtained after heating) may be used as substrate or a part thereof. Where a film casting support is used, it is preferably made of a paper, such as Kraft paper, treated to give the paper the required adhesive and release properties. Although the film casting support should have little adhesion to the resinous compositions applied thereto it should exhibit sufficient adhesion to the resinous compositions whereby it is held in contact with the first applied resinous composition during the coating and heating processes. However, the adhesion of the film casting support to the first applied resinous composition should not be so strong as to prevent removal of the support from the product obtained after heating and for convenience the support should be capable of being removed cleanly and easily from the foamed product. Film casting paper can be given the required adhesive properties by coating the paper with, for example, silicone resin and polyvinyl compounds such as polyvinyl alcohol. Silicone resin coated paper is preferred and, by varying the quantity of silicone used in the coating, paper of the desired adhesive properties may be prepared. Suitable film casting papers are commercially available, one such paper being that sold under reference M 4/17 by the Wiggins Teape Group. When using a film casting support as substrate, an overall layer of resinous composition, e.g. a polyvinyl chloride plastisol, may if desired first be applied to the film casting support, this layer of resinous composition subsequently serving as a backing layer for the product following removal of the film casting support.

As stated above, the resinous composition is advantageously applied on to selected areas of the substrate by the technique of rotary screen printing. In this method of printing, the resinous composition is forced through a rotary metal cylindrical screen on to the material to be printed. The pattern is formed either by blanking off areas of the screen, e.g. using a cross-linkable lacquer, or alternatively by producing a screen which instead of an overall mesh has a mesh which itself is in the form of the desired pattern with other areas of the screen being without mesh holes.

The resin composition used in the process according to the invention is preferably a polyvinyl chloride plastisol which has appropriate viscosity characteristics for rotary screen printing. The particular viscosity characteristics which are desirable are dependent upon a number of factors including the amount of plastisol to be applied per unit area of the substrate, the speed of printing and the means used for forcing the composition through the screen. With polyvinyl chloride plastisols, the plastisol will contain the polyvinyl chloride resin (selected according to the desired viscosity of the plastisol) plasticiser and stabiliser together with optional ingredients such as for example fillers, viscosity modifiers and volatile additives. As explained above, the first applied resin composition may optionally also contain a blowing agent but preferably a blowing agent will be absent.

The polyvinyl chloride included in the plastisol may be a homopolymer or copolymer, copolymers when used preferably containing a major proportion of units derived from vinyl chloride. Other copolymerised monomers which can be incorporated in the copolymers as desired include for example vinyl acetate and vinylidene chloride. The particle size of the polymer used is of importance in that the polymer particles must readily pass through the rotary screen used for printing. The particle shape may also be of importance in obtaining a plastisol composition having the most desirable viscosity characteristics for rotary screen printing; in general the particle shape should be selected to increase the pseudoplastic character of the plastisol. One polyvinyl chloride polymer which can with advantage be used in formulating plastisols for rotary screen printing is that known by the trade name "Breon P130/1", the word "Breon" being a registered Trade Mark.

The plasticisers used in polyvinyl chloride plastisols for rotary screen printing are conveniently phthalate plasticisers, for example nonyl, octyl and dialphanyl phthalates. Phosphates (e.g. trixylenyl and tricresyl phosphates) may also for example be used as plasticisers.

The plastisols will conveniently contain stabilisers, i.e. substances capable of retarding decomposition of the resin during compounding and subsequent exposure to light, such as mixed barium, cadmium and/or zinc salts of fatty acids such as for example stearic, lauric and ricinoleic acids. Other known stabilisers include certain organo-tin compounds e.g. dibutyl tin dilaurate and lead-containing compounds such as dibasic lead carbonate and lead stearate. Auxiliary stabilisers such as epoxidised soya bean oil may also be incorporated as desired.

Fillers may be incorporated into the plastisols as optional ingredients. Various inert inorganic substances may be used as fillers, the most convenient being calcium carbonate e.g. in the form of whiting, precipitated chalk, ground limestone or ground dolomite.

Viscosity modifiers may also be incorporated as required to influence the viscosity characteristics of the plastisol, hexylene glycol being an example of a viscosity modifier which can conveniently be used.

Volatile additives may also be included in the plastisols, examples of such additives being solvents such as for example white spirit and low boiling esters.

As stated above, the proportions of the various ingredients used will advantageously be selected to provide a plastisol having suitable viscosity characteristics for rotary screen printing. In general, preferred plastisols for use according to the present invention will contain, for every 100 parts by weight of polymer present, from 30 to 100 parts by weight of plasticiser; up to 10 parts (e.g. up to 5 parts) by weight of stabiliser; up to 100 parts, advantageously up to 20 parts, by weight of filler; up to 10 parts by weight of viscosity modifier; and up to 20 parts by weight of volatile additives.

Pigments of desired colour can be incorporated into the first-applied resinous composition. Although the first applied composition is covered by at least one overall layer which will in general be opaque, before foaming it may be possible to see the first-applied resinous composition through the overall layer and this may be of assistance in registering the texturing with a printed pattern applied on to the overall layer.

The first-applied resinous compositions in the form of plastisols for rotary screen printing are conveniently printed using screens having a mesh size of from 17 to 100 British Standard Mesh, the use of a 40 British Standard Mesh having been found to be especially convenient. The thickness of the coatings of plastisol which are desirably applied depend upon the desired thickness and density of the foam in the final product. The thickness of plastisol which can conveniently be applied on to a substrate by the technique of rotary screen printing varies with the physical properties of the plastisol and also with the substrate itself, it being in general possible to print greater thickness of plastisol as quality print on to relatively absorbent substrates such as rubber bonded asbestos paper than on to relatively non-absorbent substrates such as preformed layers of polyvinyl chloride resin. In general it has been found that the thickness of resin composition applied in one rotary screen printing step is conveniently at least 0.001 or 0.002 inches and not greater than 0.015 inches and is preferably at least 0.005 inches; the optimum thickness is from 0.008 to 0.011 inches. If greater thickness over selected areas are desired, then these can readily be applied by using two or more rotary screen printing steps in series whereby two or more superimposed applications of the resinous composition are effected. The second and subsequent applications can however, if desired, only partly overlap the first application, thus providing multi-level texturing on subsequent expansion of the overall foamable composition subsequently applied.

After each application of a plastisol composition, it is in general convenient to dry the composition sufficiently to avoid undesired damage upon subsequent application of further coatings. Drying is conveniently effected by surface infrared heating or hot air heating, for example at a temperature of about 140°C. It will be appreciated that the temperature and length of time used for drying is not critical provided that the coatings of resinous composition are given adequate strength for subsequent processing and also of course provided that the temperature reached during drying is not sufficient to activate any blowing agent contained in the resinous composition. After heating, cooling is effected e.g. by contact with water-cooled rollers prior to the next step in the process. It is generally advantageous to dry the resinous composition to a matt finish, further drying whereby a glossy surface finish is obtained being preferably avoided.

The next step in the process according to the invention is the application of one or more overall layers of foamable resinous composition.

The overall layer(s) of foamable composition will generally be applied as a polyvinyl chloride plastisol and are conveniently applied by an overall spreading technique, e.g. using a doctor blade or air-knife or rotary screen printing equipment with an all over mesh screen.

The polyvinyl chloride plastisol composition used in the production of the foamable overall layer(s) are conveniently in the form of a spreadable paste. Suitable compositions are well-known and in general contain polymer (e.g. of the types described above with reference to the first-applied plastisol), blowing agent, plasticiser and optional ingredients such as fillers, viscosity modifiers and volatile additives (as described above).

The blowing agent incorporated into the plastisol is in general conveniently an organic substance which liberates nitrogen upon heating. Substances which are conveniently used as blowing agents are those which decompose over a relatively narrow temperature range. A particularly suitable blowing agent for use in the process according to the invention is azodicarbonamide.

It is in general necessary to incorporate into the foamable plastisol a quantity of a stabiliser. Preferably the stabiliser selected is one which also possesses the property of causing the blowing agent to decompose over a narrower temperature range, hereinafter referred to as a "stabiliser-kicker". Dibasic lead phthalate is a suitable stabiliser-kicker, and other substances which may be used include certain other lead-containing compounds, certain organo-tin compounds and certain metal soaps, particularly stearates of metals such as zinc, cadmium, barium and aluminium.

The foamable composition preferably contains up to 10 parts (e.g. up to 5 parts) by weight of blowing agent per 100 parts by weight of polymer. The proportions of the remaining plastisol ingredients are preferably within the limits specified above in connection with the first-applied resinous composition.

In surface covering materials produced by the process according to the invention, the upper surface of the foamable overall layer or layers can be used as background colour in the final product. It will then in general be preferred to incorporate pigments into the resinous composition used for the foamable overall layer(s) or when more than one overall layer is applied, used at least for the uppermost foamable overall layer. Where a white background is desired for the final product, the pigment is conveniently provided by titanium white. When coloured backgrouds are required, inorganic pigments (e.g. iron oxide pigments and cadmium reds) and organic pigments (e.g. benzidene yellows and phthalocyanine blues and greens) may conveniently be employed.

The thickness of the foamable overall layer(s) applied can vary within wide limits and will depend upon the desired thickness and texture for the final product. If desired, the thickness can be the minimum thickness which is necessary just to cover the first-applied composition. It has been found that the thickness of the foamable overall layer is preferably 0.001 to 0.010 inches, advantageously about 0.005 inches measured at points where the first resinous composition is applied. It will be appreciated that the thickness of the foamable overall layer at points where the first resinous composition has not been applied will be substantially greater. The valleys between areas of the first resinous composition may still be detectable after application of the foamable overall layer(s) but if the foamable overall layer(s) are of sufficient thickness it is possible to obtain an essentially flat upper surface. When a relatively thin foamable overall layer is used, the valleys will still exist in the upper surface of the foamable overall layer but will be significantly shallower in depth than before application of the overall layer. Whilst if desired two or more foamable overall layers can be applied, it is generally convenient to apply the desired thickness of foamable overall layer in one process step.

If desired, the application of the foamable overall layer(s) can be followed by the application of one or more non-foamable overall layers. Where a non-foamable overall layer is applied, it will in general conveniently have a thickness of at least 0.0005 inches. An advantage of applying a non-foamable overall layer is that the transparent wear layer is then separated from the foamed resinous composition in the final product. The inclusion of a non-foamable overall layer may also serve as a reinforcement imparting additional strength to the product in use. The presence of an overall non-foamable layer provides a wider field of choice for the polymer used in the wear layer.

Certain polymers which are otherwise desirable for wear layers in that they provide good wear characteristics, lustre or other properties have the disadvantage that they are discoloured or otherwise adversely affected when used in wear layers in direct contact with foamed layers; such polymers can be used in the process according to the invention with an intervening non-foamed overall layer. Also the presence of the intervening non-foamed overall layer generally avoids the danger of flaws being formed in the wear layer due to entrapment of gas released from the foamable resin composition(s) during foaming. A still further advantage is that when an opaque non-foamed overall resinous layer is used it and not a foamed layer provides the background colour for the product, this being particularly advantageous where a white background is required as a more brilliant and desirable white is generally obtainable with non-foamed layers than with foamed layers. The thickness of the non-foamable layer will preferably be from 0.0005 to 0.005 inches, advantageously about 0.002 inches, and can be applied by similar methods to those used for the application of the overall foamable layer(s) using similar compositions except for the ommission of a blowing agent.

Where the overall layer or layers are provided using plastisols as described above, after application of the overall layer (or each layer in the event that two or more overall layers are utilised), drying is again effected to provvide a surface having sufficient strength for the subsequent printing process. The methods and temperatures conveniently used are as for the drying of the first resinous composition. The upper surface of the overall layer(s) is to be used as a recipient for the decorative pattern subsequently to be applied, and therefore it is again preferred to control the drying to obtain a matt surface finish.

After drying, the assembly is cooled prior to subsequent printing.

The next step in the process according to the invention is the application by printing of a decorative pattern on to the surface of the overall layer(s). Rotary screen printing is advantageously used for this step although other printing methods such as for example block printing can if desired be used. One particular advantage of rotary screen printing is that it is possible using this technique to print in the valleys (corresponding to areas in which none of the first resinous composition has been applied) which as explained above may be present on the overall layer surface. Also the speed of rotary screen printing is compatible with the speed of the other process steps thus facilitating the carrying out of the process on a straight-through production line.

Where rotary screen printing is used, the printing compositions are preferably polyvinyl chloride plastisols of the kind hereinbefore described with reference to the application of the first resinous layer, with or without a blowing agent incorporated although other printing compositions such as for example pigmented water based acrylic resin emulsions can if desired be used. If printing compositions containing a blowing agent are used, then further texturing effects can be obtained in the final product. The plastisols can contain pigments as desired, suitable types of pigment being as hereinbefore described with reference to the formulation of the overall layer plastisol compositions. The decorative pattern applied can if desired be in register with the textured effect to be provided by subsequent foaming of the foamable overall resinous compositions. Where differently coloured plastisols are to be applied to different portions of the overall layer surface, a plurality of rotary screen printing steps can be carried out in series with drying and cooling preferably to a matt finish between each step. In general the thickness of the coatings of printing composition applied can be varied within wide limits. Where it is desired to apply as thin coatings as possible, coatings of high opacity having a thickness of about 0.001 inches can be used although even thinner coatings down to for example about 0.0002 inches may be sufficient particularly where multi-tone effects are desired. If thicker coatings are applied, relief effects can be obtained in the final product. The rotary screen printing is conveniently carried out using from 40 to 120 British Standard Mesh screens, a 60 British Standard Mesh screen being particularly convenient in this regard.

The decorative prints and the overall layer(s) to which they have been applied may have adequate wear characteristics without the protection of an overall transparent wear layer. In general, however, an overall transparent wear layer is preferably applied. As with the previous overall layer(s), this is conveniently provided by a polyvinyl chloride composition. Although a pre-formed calendered film can be used, it is preferred to apply the wear layer as a polyvinyl chloride plastisol, suitable formulations for providing a transparent wear layer being well-known. The thickness of the wear layer depends upon the wear characteristics required. In the case of flooring materials for domestic use, wear layers having a thickness of from 0.004 to 0.015 inches are conveniently used.

Finally heating is effected to gel the plastisols present in the assembly and to decompose the blowing agent present in the foamable resin composition(s). With polyvinyl chloride plastisols and the blowing agents commonly used therewith, temperatures within the range of from 165° to 200°C are in general preferably used. The ingredients of the foamable resin composition and the heating step are advantageously controlled to give approximately 1.5 to 5- fold expansion on foaming. Heating at about 180° to 190°C for about 100 seconds has given satisfactory results in processes according to the invention carried out under test conditions.

Since there is present a greater amount of foamable composition in areas where non of the first resinous composition has been applied as compared with areas where the first resinous composition has been applied, a textured effect will be obtained on foaming.

Where a film casting support is employed, this can be removed following the heating step and a permanent backing layer can then be applied. Thus for example a polyvinyl chloride backing layer can be applied by adhesion of a preformed calendered film.

Alternatively, as discussed previously, a resinous composition may be applied to the film casting support prior to step (a) and following removal of the film casting support this resinous composition will serve as the permanent backing layer.

The process according to the invention has been described above particularly with reference to surface covering materials produced using polyvinyl chloride resinous compositions. It will ba appreciated however that other resinous compositions can if desired be used. Thus for example acrylic based compositions can be used to provide coats in the substrate and polyurethane-based compositions can be used to provide flexible wear layers.

The accompanying drawings illustrate schematically one embodiment of the process according to the invention, the drawings showning cross-sections of surface covering materials at various stages of manufacture.

FIG. 1 shows a substrate 1 to selected areas of which has been applied a non-foamable resinous composition 2.

Figure 2:
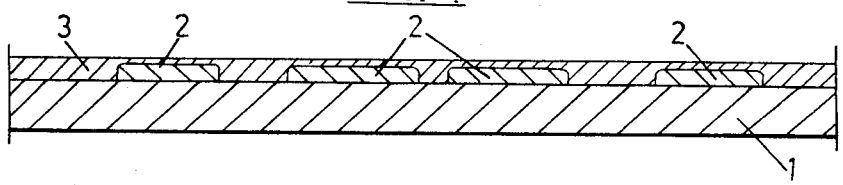

In FIG. 2, an overall layer of foamable resinous composition 3 has been applied so as to just cover the areas of non-foamable composition 2.

Figure 3:
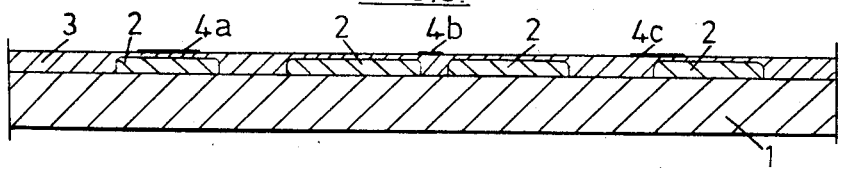

In FIG. 3, coatings 4a, 4b and 4c of a printing composition have been applied to the overall foamable layer 3. Coating 4a has been applied coincident with one of the areas of non-foamable composition 2 and coatings 4b and 4c have been applied partly coincident and non-coincident respectively with the areas of non-foamable composition 2.

Figure 4:
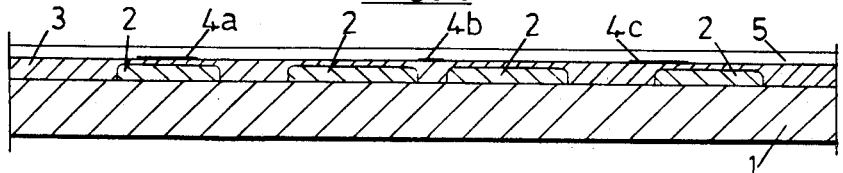

In FIG. 4, an overall transparent wear layer 5 has been applied.

Figure 5:
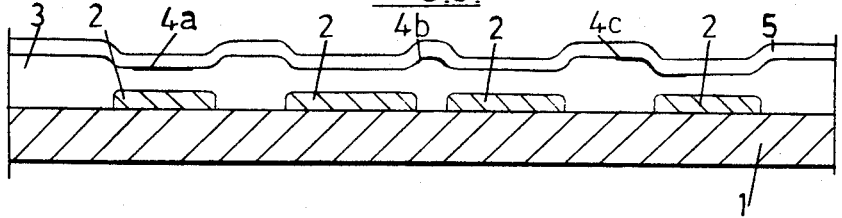

FIG. 5 shows the assembly after heating to effect gelation of the various plastisols and foaming of the foamable layer 3 to provide the final product.

Apart from the steps hereinbefore described as providing the process according to the invention, it will be appreciated that additional process steps can be effected as desired. Thus for example a resinous layer can be provided on the side of the substrate remote from the foamable resin composition at any stage in the course of the process, such layer being foamable or nonfoamable as desired.

The process according to the invention is particularly useful for the preparation of flooring materials. Thus flooring materials can be prepared which have excellent wear properties, the transparent wear layer serving to protect the layers beneath, and an attractive appearance due to the combination of textured effect and decorative printing. The process has the further advantage of complete flexibility insofar as the decorative pattern to be applied is concerned. Once the overall layer(s) of resinous composition has/have been applied over the substrate and the first-applied resinous composition thereon, the overall layer surface can be printed in any desired manner with printing composition applied on to any portion of the surface including valley portions.

Although the process is applied with particular advantage to the production of floor covering materials, it can be used for the production of other surface coverings, particularly wall and ceiling surface coverings.

The following Example illustrates the invention:

Example

A first polyvinyl chloride plastisol having the following composition is prepared:

|  | Parts by weight |
| --- | --- |
| Polyvinyl chloride ("Breon P 130/1") | 100 |
| Dialphanyl phthalate | 65 |
| Hexylene glycol | 3 |
| Barium/cadmium liquid soap stabiliser | 2.5 |
| Epoxidised soya bean oil | 3 |

The plastisol is printed on to selected areas of an asbestos paper substrate of thickness 0.032 inches to a thickness of 0.009 inches using a rotary screen printer provided with a 40 British Standard Mesh screen. The coated substrate is then dried to a matt finish by infrared heating at 140°C following by cooling by contact with a water-cooled roll.

A second polyvinyl chloride plastisol having the following composition is next prepared:

|  | Parts by weight |
| --- | --- |
| Polyvinyl chloride ("Breon P 130/1") | 100 |
| Dialphanyl phthalate | 66 |
| Hexylene glycol | 3 |
| Dibasic lead phthalate | 2 |
| Azodicarbonamide | 1.25 |
| Titanium white | 10 |

This second plastisol which has the form of a spreadable paste is applied by doctor knife as an overall coating having a thickness of 0.014 inches measured at points where the first plastisol was not applied. Following application, the assembly is again dried to a matt finish by infra-red heating at 140°C followed by cooling by contact with a water-cooled roll.

Third and fourth polyvinyl chloride plastisols having the following composition are next prepared:

| | Parts by weight |
|---|---|
| Polyvinyl chloride ("Breon P 130/1") | 100 |
| Dialphanyl phthalate | 65 |
| Hexylene glycol | 3 |
| Barium cadmium liquid soap stabiliser | 2.5 |
| Epoxidised soya bean oil | 3 |
| Pigment | as necessary for desired colouring |

The third plastisol composition is printed on to selected areas of the assembly to a depth of 0.0005 inches using a rotary screen printer provided with a 60 British Standard Mesh screen. The coated substrate is then dried to a matt finish by infra-red heating at 140°C followed by cooling by contact with a water-cooled roll. The fourth plastisol composition is then printed on to further selected areas of the assembly to a depth of 0.0005 inches with drying and cooling exactly as for the third plastisol composition.

A fifth polyvinyl chloride plastisol composition to provide the wear layer is then prepared having the following composition:

| | Parts by weight |
|---|---|
| Polyvinyl chloride (dispersion grade) | 100 |
| Dinonyl phthalate | 15 |
| Butylbenzyl phthalate | 25 |
| Hexylene glycol | 3 |
| Barium cadmium liquid soap stabiliser | 2.5 |
| Epoxidised soya bean oil | 3.0 |
| White Spirit | 3.0 |

This fifth plastisol having the form of a spreadable paste is applied by doctor knife as an overall coating having a thickness of 0.008 inches.

Following application, the assembly is heated in an oven to 180°C for 100 seconds to gel the plastisols and effect foaming of the second plastisol composition; the second plastisol composition foams to give a foamed layer having a thickness of 0.030 inches measured at points where the first plastisol was not applied. Following heating the assembly is cooled and rolled up to provide the finished product.

I claim:

1. A process for the production of surface covering materials having a textured effect which comprises the steps of (a) applying at least one resinous composition to a thickness of at least 0.005 inches to selected areas of a substrate; (b) applying one or more overall layers of at least one resinous composition containing a blowing agent and foamable throughout over the substrate and resinous composition thereon; and (c) heating to effect foaming of the foamable resinous composition whereby a surface covering material having a textured effect is produced.

2. A process as claimed in claim 1 wherein the resinous composition applied in step (a) is essentially non-foamable.

3. A process as claimed in claim 1 wherein the resinous composition applied in step (a) comprises a polyvinyl chloride plastisol.

4. A process as claimed in claim 3 wherein the said resinous composition contains, for every 100 parts by weight of polyvinyl chloride present, from 30 to 100 parts by weight of plasticiser, up to 10 parts by weight of stabiliser, up to 100 parts by weight of filler, up to 10 parts by weight of viscosity modifier and up to 20 parts by weight of volatile additives.

5. A process as claimed in claim 1 wherein in step (a) a thickness of at least 0.008 inches of resinous composition is applied.

6. A process as claimed in claim 1 wherein the resinous composition applied in step (b) comprises a polyvinyl plastisol containing a blowing agent.

7. A process as claimed in claim 6 wherein the blowing agent is azodicarbonamide.

8. A process as claimed in claim 6 wherein the said plastisol contains, for every 100 parts by weight of polyvinyl chloride present, from 30 to 100 parts by weight of plasticiser, up to 10 parts by weight of stabiliser, up to 100 parts by weight of filler, up to 10 parts by weight of viscosity modifier, up to 20 parts by weight of volatile additives and up to 10 parts by weight of blowing agent.

9. A process as claimed in claim 1 wherein the said resinous composition of step (a) and the said overall layer of step (b) are pigmented.

10. A process as claimed in claim 1 wherein in step (b) the overall layer is applied to a total thickness of from 0.001 to 0.10 inches measured at points where the resinous composition has been applied in step (a).

11. A process as claimed in claim 1 wherein step (c) is effected at a temperature of 180° to 190°C for about 100 seconds.

12. A process as claimed in claim 1 wherein the substrate comprises a woven or non-woven fabric, a preformed film or a film casting support, in the latter case the film casting support being removed subsequent to step (c).

13. A surface covering material having a textured effect which comprises a substrate or backing layer, at least one resinous composition on selected areas of the substrate or backing layer to a thickness of at least 0.005 inches and at least one layer of a resinous composition foamed throughout over the substrate and the resinous composition thereon, the surface of the foamed resinous composition being at a lower level in areas with the said resinous composition thereunder than in other areas of the surface covering material.

14. A surface covering material as claimed in claim 13 wherein the resinous composition on selected areas of the substrate is non-foamed.

15. A surface covering material as claimed in claim 14 wherein the resinous composition on selected areas of the substrate has a thickness of at least 0.008 inches.

16. A surface covering material as claimed in claim 13 which includes a decorative pattern applied to the surface of the foamed resinous composition.

17. A surface covering material as claimed in claim 13 which includes an overall layer of a non-foamed resinous composition over the surface of the foamed resinous composition and a decorative pattern applied to the surface of the non-foamed resinous composition.

18. A surface covering material as claimed in claim 13 which includes a transparent wear layer.

* * * * *

UNITED STATES PATENT OFFICE
CERTIFICATE OF CORRECTION

Patent No. 3,914,485      Dated October 21, 1975

Inventor(s) IVAN CURTIS

It is certified that error appears in the above-identified patent and that said Letters Patent are hereby corrected as shown below:

On the title page, between lines 5 and 6, there should appear the following:

--Foreign Application Priority Data

February 21, 1973    Great Britain.......8591/73--.

Signed and Sealed this thirtieth Day of March 1976

[SEAL]

Attest:

RUTH C. MASON
*Attesting Officer*

C. MARSHALL DANN
*Commissioner of Patents and Trademarks*